United States Patent [19]

Miura et al.

[11] Patent Number: 4,882,669

[45] Date of Patent: Nov. 21, 1989

[54] MULTI COMPUTER FAIL SAFE CONTROL APPARATUS

[75] Inventors: Makoto Miura, Hino; Kazuki Miyamoto; Masato Ishida, both of Yokohama, all of Japan

[73] Assignee: Canon Kabushiki Kaisha, Tokyo, Japan

[21] Appl. No.: 131,267

[22] Filed: Dec. 9, 1987

Related U.S. Application Data

[63] Continuation of Ser. No. 674,849, Nov. 26, 1984, abandoned.

[30] Foreign Application Priority Data

| | | | |
|---|---|---|---|
| Nov. 28, 1983 | [JP] | Japan | 58-223542 |
| Nov. 28, 1983 | [JP] | Japan | 58-223543 |
| Nov. 28, 1983 | [JP] | Japan | 58-223544 |
| Nov. 28, 1983 | [JP] | Japan | 58-223545 |

[51] Int. Cl.$^4$ .................................. G06F 11/00
[52] U.S. Cl. ........................ 364/184; 364/131; 364/187; 371/9.1; 371/12; 371/34; 371/71
[58] Field of Search .................. 364/131–136, 364/200, 900, 184–187; 371/9, 11, 12, 15, 20, 34, 71, 36, 68

[56] References Cited

U.S. PATENT DOCUMENTS

| | | | |
|---|---|---|---|
| 3,805,234 | 4/1974 | Masters | 37/34 |
| 3,995,258 | 11/1976 | Barlow | 371/34 |
| 4,070,648 | 1/1978 | Mergenthaler et al. | 371/34 |
| 4,115,847 | 9/1978 | Osder et al. | 864/133 |
| 4,198,678 | 4/1980 | Maatje et al. | 364/133 |
| 4,208,712 | 6/1980 | Deutsch | 364/132 |
| 4,254,499 | 3/1981 | Yoshikane | 371/34 |
| 4,301,507 | 11/1981 | Soderberg et al. | 371/34 |
| 4,377,000 | 3/1983 | Staab | 364/184 |
| 4,521,847 | 6/1985 | Ziehm et al. | 371/9 |
| 4,553,204 | 11/1985 | Hashimoto | 371/12 |
| 4,562,528 | 12/1985 | Baba | 364/187 |
| 4,567,560 | 1/1986 | Polis et al. | 371/184 |
| 4,580,232 | 4/1986 | Dugan et al. | 364/132 |
| 4,582,207 | 4/1986 | Arai et al. | 364/131 |
| 4,587,470 | 5/1986 | Yamawaki | 364/135 X |
| 4,590,554 | 5/1986 | Glazer et al. | 371/11 |
| 4,628,508 | 12/1986 | Sager et al. | 364/187 |

FOREIGN PATENT DOCUMENTS

0003004  1/1978  Japan ........................ 371/34

OTHER PUBLICATIONS

"Error Recovery in Data Transmission", Marwald et al., IBM Tech. Disclosure Bulletin, vol. 13, No. 10, pp. 3162-3163, 3-71.
"Retransmission Using Stored CRC Values", Bederman et al., IBM Tech. Dis. Bull., vol. 26, no. 8, p. 4195, 1/1984.

Primary Examiner—John R. Lastova
Attorney, Agent, or Firm—Fitzpatrick, Cella, Harper & Scinto

[57] ABSTRACT

There is a control apparatus using a plurality of microcomputers for controlling an apparatus. This control apparatus comprises a first microcomputer for controlling loads and a second microcomputer, wherein the first microcomputer transmits predetermined information to the second mircocomputer and discriminates the reply data which is send therefrom. When they coincide, the first microcomputer executes a predetermined control operation. When the second microcomputer detects an error in the information transmitted from the first microcomputer, the second microcomputer allows the first microcomputer to stop the control of the loads, thereby realizing the safe control of the loads. On the other hand, predetermined priorities may be given to the microcomputers. When the microcomputer having a high priority is reset, all of the lower significant microcomputers are reset, thereby minimizing a damage when abnormality occurs. A main program malfunction of the microcomputer may be detected by a checking means provided in a sub-routine program, thereby enabling the control to be restarted safely.

4 Claims, 9 Drawing Sheets

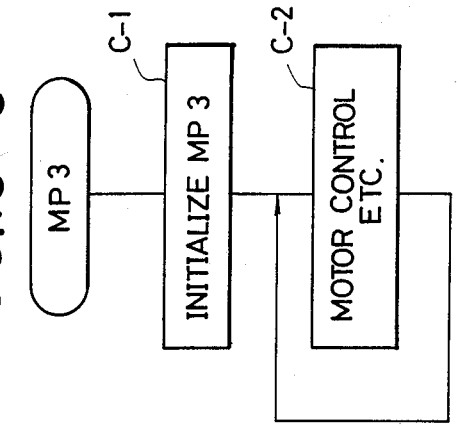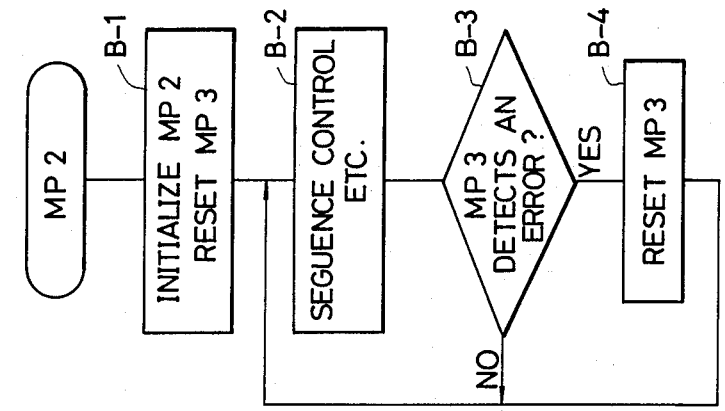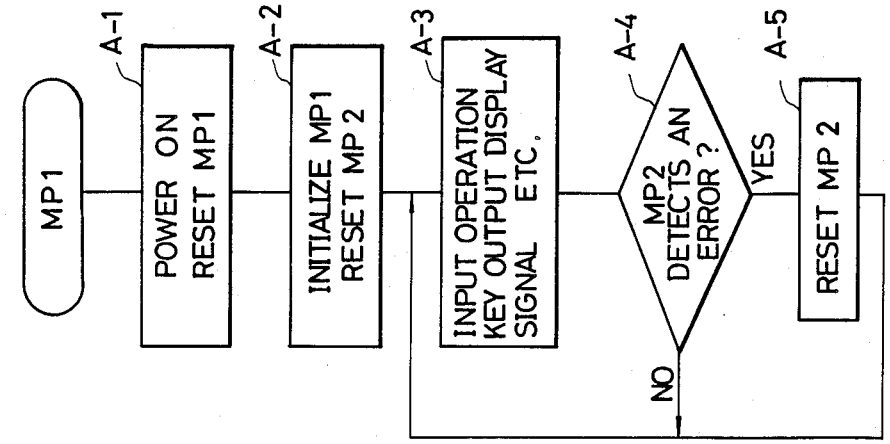

FIG.11
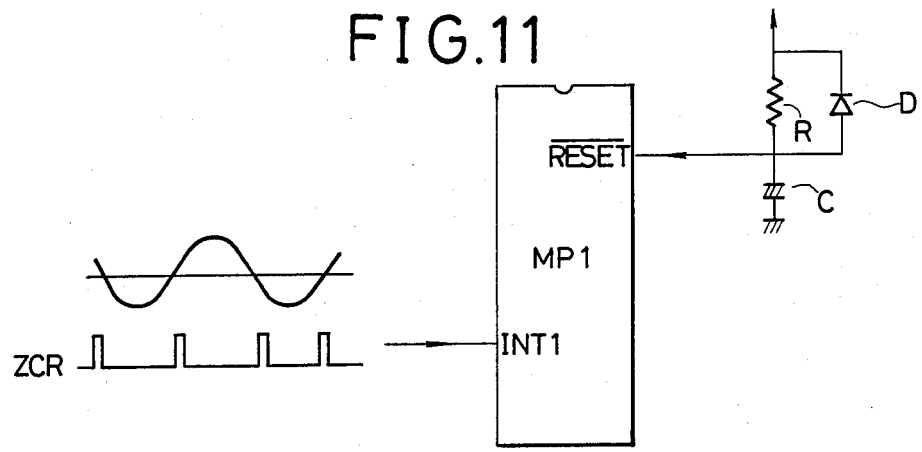
FIG.12-a
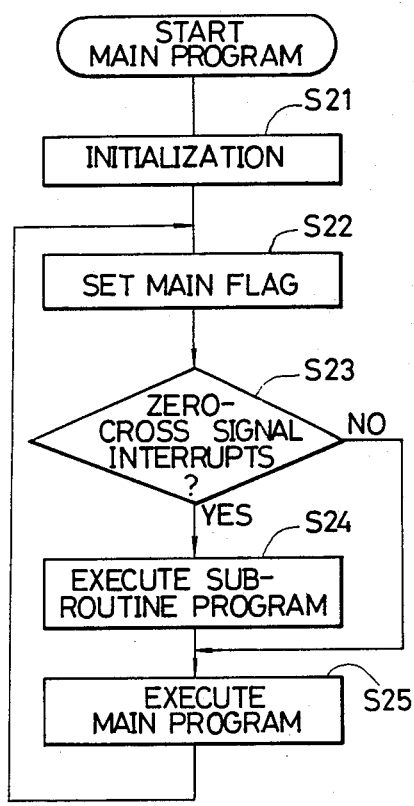
FIG.12-b
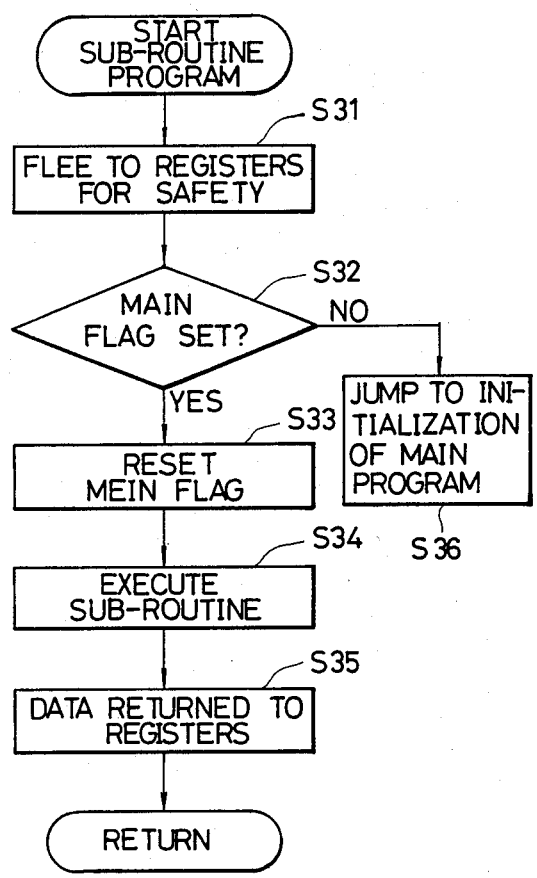

MULTI COMPUTER FAIL SAFE CONTROL APPARATUS

This is a continuation of Ser. No. 674,849, filed 11/26/84, now abandoned.

BACKGROUND OF THE INVENTION

1. Field of the Invention

The present invention relates to a control apparatus using one or a plurality of microcomputers.

2. Description of the Prior Art

Even in a conventional apparatus which could be controlled by a single microcomputer, multi functions have been recently required. To satisfy this demand, there is a tendency to use a plurality of microcomputers. Due to this, many loads can be easily controlled with a high degree of accuracy on the basis of a program. However, to realize this, it is necessary to assume that the microcomputers will operate normally. On the other hand, the use of a plurality of microcomputers causes the control to be complicated and produces a large possibility of error due to the noise generated in the apparatus, or the noise from a outside, etc. Therefore, if there occurs the difference in information among the respective microcomputers, correct control cannot be performed.

In addition, there are efforts to reduce the noise margin to realize a high processing speed and the like, resulting in an increase in the possibility of error. Under such situation, if a malfunction should occur and one of the microcomputers operates erroneously, another microcomputer controlled by this malfunctioning microcomputer will not operate correctly, if this occurs, there is a risk that the apparatus controlled by the microcomputer may become unsafe.

Particularly, although safety is important in control of the loads such as a lamp, heater and the like that may endanger humans, if the malfunction should occur, the only way to correct the problem is to reset the load from the outside.

Further, the contents of the registers in the microcomputers may be damaged due to not only the external noise such as static electricity or the like but also the internal noise or the like. The possibility of a program malfunction in the microcomputer as a result of such damage is increasing.

SUMMARY OF THE INVENTION

It is an object of the present invention to eliminate the above-mentioned drawbacks.

Another object of the invention is an improvement of a control apparatus.

Another object of the invention is to provide a control apparatus wherein, in case of controlling an apparatus by a plurality of microcomputers, reliability of information among the respective microcomputers is raised.

Another object of the invention is to provide a control apparatus in which at least one of a plurality of microcomputers can control a load and another microcomputer can stop the control of the load, thereby performing the safe control of the load.

Another object of the invention is to provide a control apparatus in which priorities are imparted to a plurality of microcomputers and when the microcomputer with a high priority is reset, all of the lower significant microcomputers are reset, thereby minimizing the probability of a malfunction.

Another object of the invention is to provide a control apparatus which can detect a program malfunction of a microcomputer and can safely restart the control.

Other objects, features and advantages of the present invention will be more apparent from the following detailed description in conjunction with the accompanying drawings.

BRIEF DESCRIPTION OF THE DRAWINGS

FIGS. 10A to 10C are flow charts for explaining the operation of the circuit of FIG. 9;

FIG. 11 is a circuit diagram showing the main part of FIG. 3; and

FIGS. 12A and 12B are flow charts for explaining the operation of the circuit of FIG. 11.

DETAILED DESCRIPTION OF PREFERRED EMBODIMENTS

One embodiment of the present invention will now be described hereinbelow with reference to the drawings.

Figure 1:
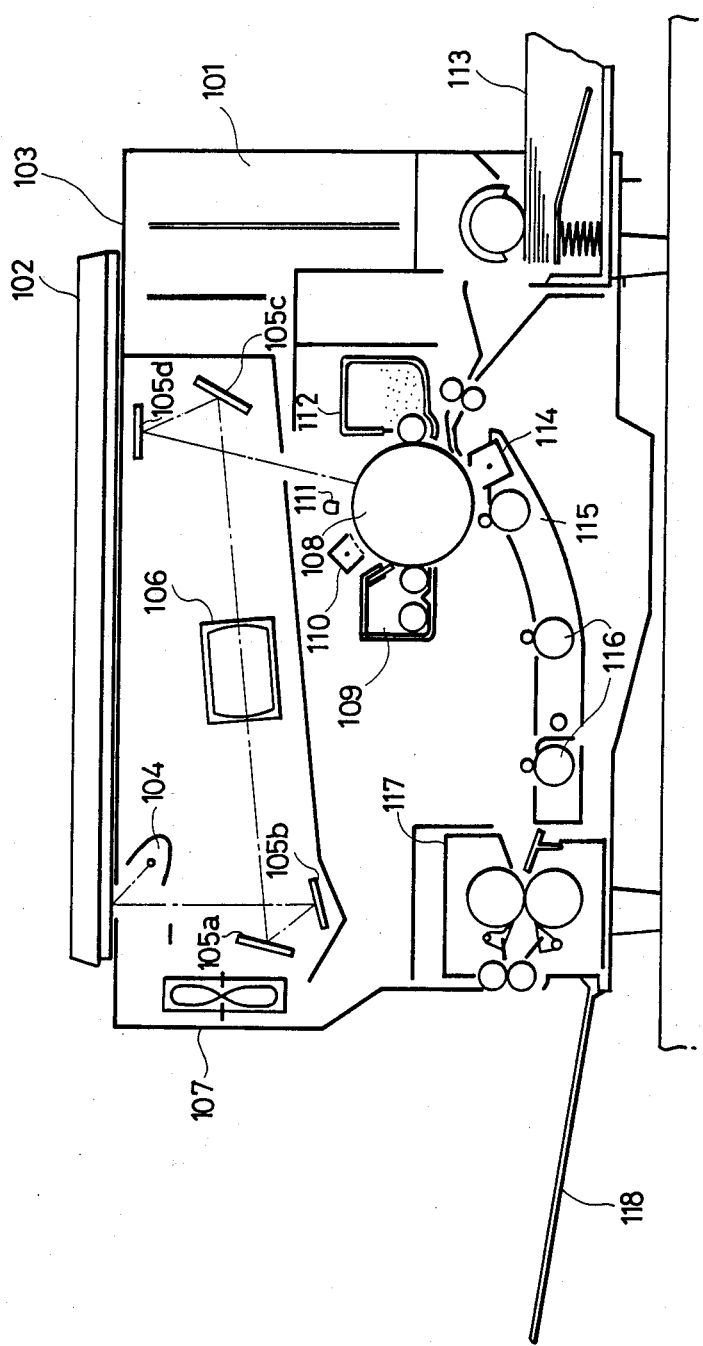
FIG. 1 is a cross sectional diagram illustrating an apparatus in which the present invention is employed.

FIG. 1 is a cross sectional view illustrating a copier to which the present invention can be applied, in which a reference numeral 101 denotes a copier main body; 102 an original plate cover and a movable original plate; 103 a console section; 104 a lamp for exposing an original; 105a to 105d reflecting mirrors; 106 a zoom lens for variable magnification power; 107 a fan for exhausting the heat; 108 a photo sensitive drum; 109 a cleaner; 110 an electrifier; 111 a lamp for exposing a blank; 112 a developing apparatus; 113 a paper feed cassette; 114 a transfer electrifier; 115 a transfer roller; 116 a carrier roller; 117 a fixing apparatus; and 118 a copy tray.

In this copier, an image is formed in accordance with a well-known electrophotographic process; therefore, its detail is omitted.

Figure 2:
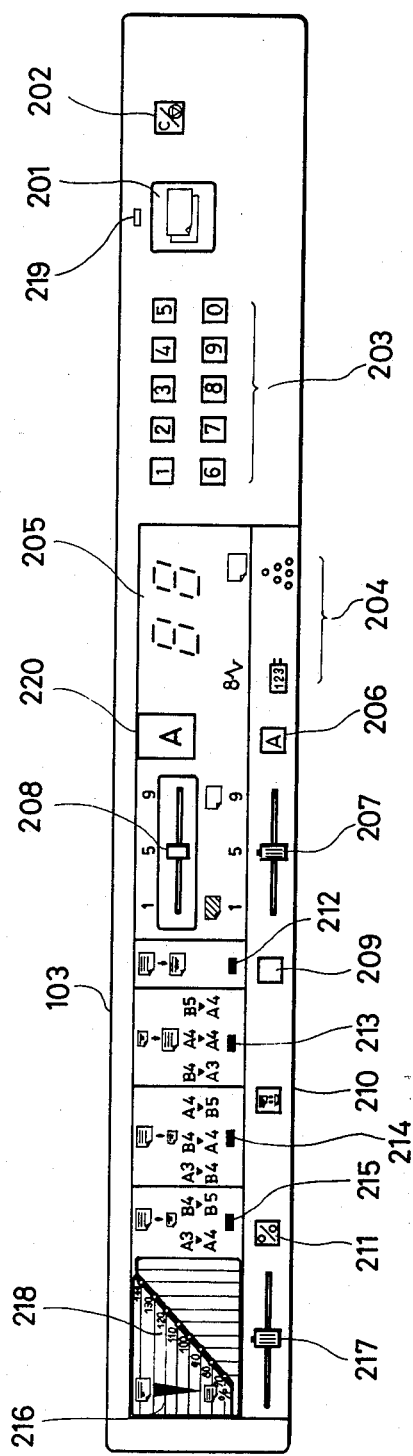
FIG. 2 is a diagram showing a console section of the apparatus of FIG. 1.

FIG. 2 is a diagram showing the console panel 103, in which a numeral 201 denotes a copy start key; 202 is a clear/stop key; 203 ten-keys to set a copy quantity; 204 indicators to indicate the states such as a jam in the copier including no-paper, supplement of toner, inspection of a control counter, etc.; 205 a display which is commonly used to indicate a copy quantity, magnification and abnormality; 206 a copy concentration AE key; 220 a copy concentration AE mode indicator which is illuminated on when the AE mode is selected by depressing the AE key 206; 207 a copy concentration lever; 208 a copy concentration correcting lever to correct a proper position of the copy concentration lever 207; 209 an equal power copy mode key; and 210 a variable power copy mode selecting key. A desired magnification mode can be selected by repeatedly pressing this key 210. A numeral 211 denotes a copy magnification indicating key. The depression of this key 211 allows the lower two digits of the set copy magnification to be displayed in the display 205. For example, if the set copy magnification is 124%, '24' will be displayed. Numerals 212 to 215 represent fixed copy magnification mode indicators; 216 is a stepless copy magnification mode indicator; and 217 is a stepless variable power lever. When the stepless variable power is selected, an arbitrary magnification can be set by this lever. In addition, the copy magnification set width lies within a range of 65 to 142%. A magnification scale 218 corresponds to the position of the variable power lever 217. A main/wait indicator 219 flickers in the waiting mode and is illuminated when the copying operation is possible.

Figure 3:
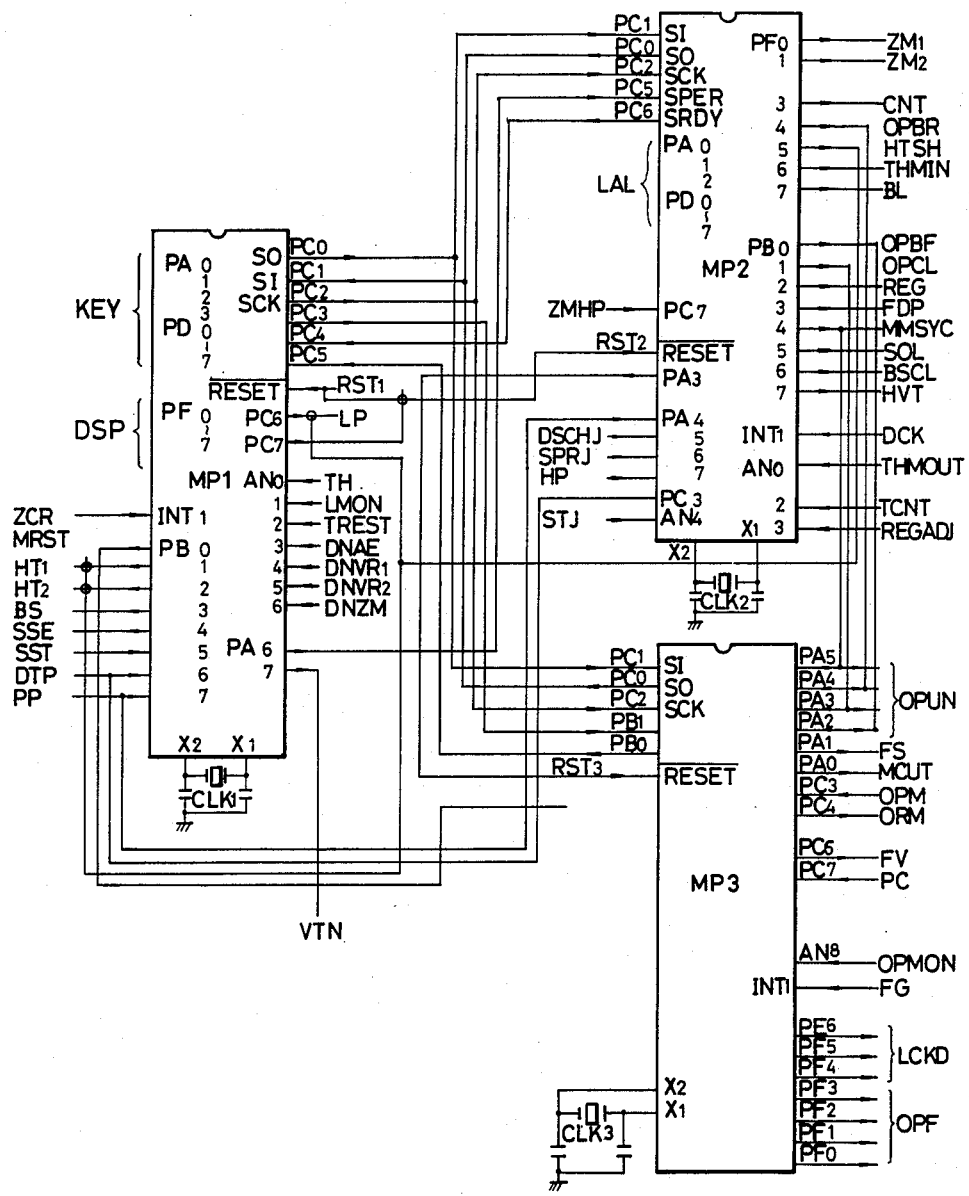
FIG. 3 is a circuit diagram showing an apparatus according to the invention.

FIG. 3 shows a control circuit diagram in the present embodiment. MP1 to MP3 denote one-chip microcomputers, in which the MP1 and MP2 perform the DC controller control. Particularly, the MP1 controls the key input, indication and the like in the console section and the MP2 executes the sequence control of the copier. The MP3 controls a DC motor. PA0 to PA7 in each microcomputer denote input or output ports; RESET indicates a reset terminal of each microcomputer; and INT1 is an interruption input terminal. Next, a signal which is input or output from each port will be simply described. ZCR is a zero-cross detection signal; MRST a main motor reset control signal; HT1 a main heater control signal; HT2 a sub heater control signal; BS a developing bias control signal; SSE a sorter set signal; SST a sorter standby signal; DTP an original head detection signal; PP a detection signal to detect the presence and absence of a paper which is fed; LP an exposing lamp phase control signal; TH a temperature detection signal of a thermistor of the heater; LMON a monitor signal of the exposing lamp; TREST a detection signal to detect the presence and absence of a toner; DNAE a proper concentration signal of a copy; DNVR1 and DNVR2 signals indicative of the states of the copy concentration levers 207 and 208, respectively; DNZM a signal indicative of the state of the stepless variable power lever; KEY a signal indicative of the state of the key input or the state when the machine is adjusted; DSP a signal to the indicator; $V_{TN}$ a power source for detecting the unused toner quantity; ZMHP a home position detection signal of the zoom lens; DSCHJ a paper exhaustion jam detection signal; SPRJ a separation jam detection signal; HP an original plate home position detection signal; STJ a sorter jam detection signal; ZM1 and ZM2 signals to instruct the position of the zoom lens, respectively; CNT a copy quantity counter signal; OPBR a signal to stop the return of the optical system (original plate); HTSH an ON/OFF control signal when abnormality of the heater is detected; THMIN a signal to input the disconnection of the thermistor into the memory; BL a blank exposure control signal; OPBF a signal to instruct the forward or backward movement of the optical system; OPCL an ON/OFF control signal of the movement of the optical system; REG a resist roller control signal; FDP a paper feed timing control signal; MMSYC a signal to control the fan and the deelectrification and pre-exposure of the portion of the separating belt for separating the photo sensitive drum and transfer paper synchronously with a main motor; SOL a lower-stage paper feed solenoid control signal; BSCL a developing bias ON/OFF control signal; HVT a high voltage power source control signal; DCK a drum clock; THMOUT a signal to output the disconnection of the thermistor from the memory; TCNT a total counter abnormality detection signal; REGADJ a resist timing adjustment signal; LAL an LED array control signal; OPUN a signal to diagnose the abnormality in the control of the driving motor, brake, forward movement, backward movement, and ON/OFF of the optical system; FS a magnification reference frequency; MCUT a stop signal when abnormality of the motor is detected; OPM an optical motor control reference signal to produce an FV signal mentioned later; DRM a driving motor control signal; FV the pulse speed control signal having a constant width; PC a phase control signal; OPMON an optical motor control monitor signal; FG an encoder signal of the optical motor; LCKP a locked phase display signal; OPF an optical motor filter switching signal; RST1 to RST3 reset signals of the MP1 to MP3, respectively; SI a serial communication input; SO a serial communication output; SCK a clock for serial communication; SPER a serial communication permission signal; SRDY a serial communication acceptance signal; and CLK1 to CLK3 reference clocks of the MP1 to MP3, respectively.

Figure 4:
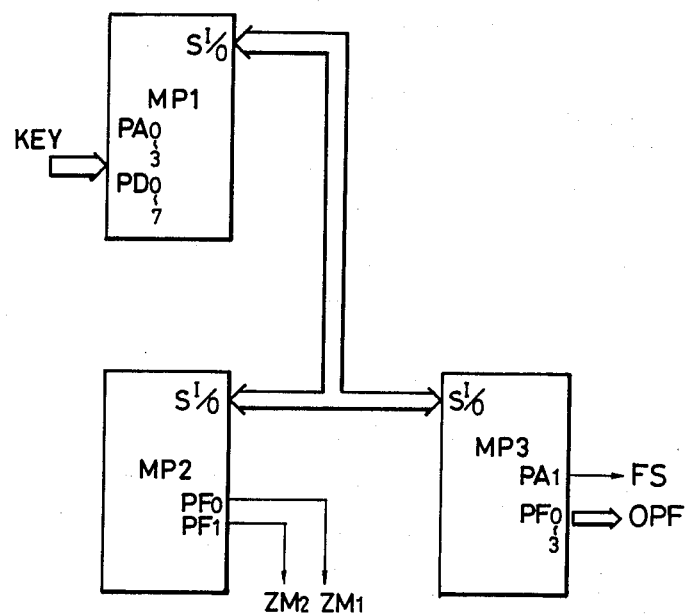
FIG. 4 is a circuit diagram showing the main part of FIG. 3.

FIG. 4 is a diagram showing the serial communication of the respective microcomputers MP1 to MP3 in the circuit arrangement shown in FIG. 3.

When the operator wants to copy, the copy start key 201 shown in FIG. 2 is pressed. The signal from the copy start key at this time is read into the MP1 through the ports PA0–PA3 and PD0–PD7. In addition, when the copy magnification is set, the MP1 reads the set magnification information from the ports PA0–PA3 and PD0–PD7 and transmits the magnification information to the MP2 and MP3 from an S I/O terminal by means of the serial communication. The MP2 and MP3 send back the magnification information sent to the MP1. Whenever the set magnification is changed, the changed magnification information is transmitted from the MP1 to the MP2 and MP3.

This magnification information is necessary for determination of the position of the zoom lens which is sequence controlled by the MP2 and is further needed as the information to determine a speed value of the motor (scan velocity of the optical system) under the control of the optical motor by the MP3.

Figure 5:
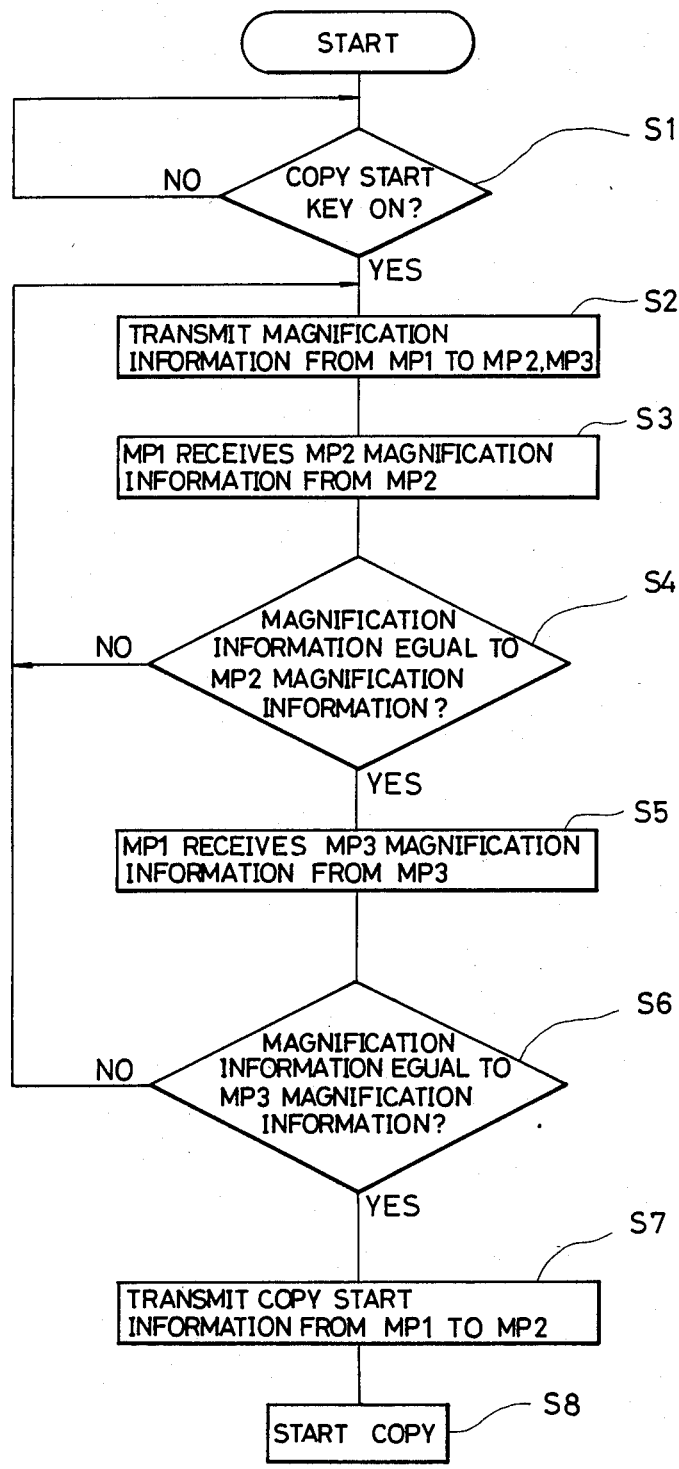
FIGS. 5 and 6 are flow charts for explaining the operation of the circuit of FIG. 4.

When the MP1 receives the signal from turn-on of the copy start key, the MP1 checks to see if the magnification information which are serially transmitted from the MP2 and MP3 are equal to the magnification information transmitted from the MP1. When the MP1 determines that they are equal, it transmits the copy start information to the MP2 for controlling the sequence operation. The transmission and reception of the information among the respective microcomputers will be explained with reference to FIGS. 5 and 6. FIG. 5 is a flow chart showing the transmission and reception of the information regarding the MP1. When the copy start key is depressed (S1), the set copy magnification information is transmitted from the MP1 to the MP2 and MP3 by means of the serial communication (S2). The MP2 and MP3 again transmit the magnification information received to the MP1. When the MP1 receives the magnification information which is sent from the MP2 (S3), it compares the magnification informatiom which is transmitted from the MP1 to the MP2 with the magnification information from the MP2 which was received by the MP1 (S4). If they are not equal, the malfunction will have occurred due to the difference between the information of the MP1 and MP2. Therefore, the magnification information is again transmitted from the MP1 to the MP2 for confirmation.

When the magnification information which is transmitted from the MP1 is equal to the magnification information received from the MP2, the MP1 receives the magnification information which is sent from the MP3 (S5), then the MP3 magnification information received by the MP3 is transmitted from the MP3 to the MP1 (S5). The magnification information which is transmitted from the MP1 to the MP3 is compared with the magnification information from the MP3 received by the MP1 (S6). When they are not equal, the magnification information is again sent from the MP1 to the MP3 for confirmation in a similar manner as mentioned above.

When they are equal, the copy start information is transmitted from the MP1 to the MP2 (S7), the MP2 executes a predetermined sequence, thereby allowing the copying operation to be started (S8).

Figure 6:
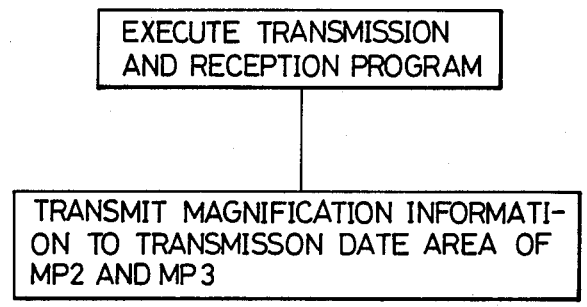

On one hand, the MP2 and MP3 always execute the process shown in FIG. 6. That is, they execute the transmitting and receiving process. After they transferred the magnification information transmitted from the MP1 into the magnification data areas in the MP2 and MP3, respectively, they transmit the magnification information to the MP1. When the copying operation is executed due to this process, the magnification information of the MP1, MP2 and MP3 completely coincide.

The invention is not limited to the confirmation of the magnification information, it can be also applied to the confirmation of the information or the like indicative of the copy state.

In addition, the invention is not limited to the control of the magnification information of the copier, but it may be applied to other apparatus.

As described above, when the information in the common data memory areas among a plurality of microcomputers coincide, a predetermined control operation is performed; therefore, the malfunction in the control is eliminated and reliability is improved.

The second embodiment will now be explained.

Figure 7:
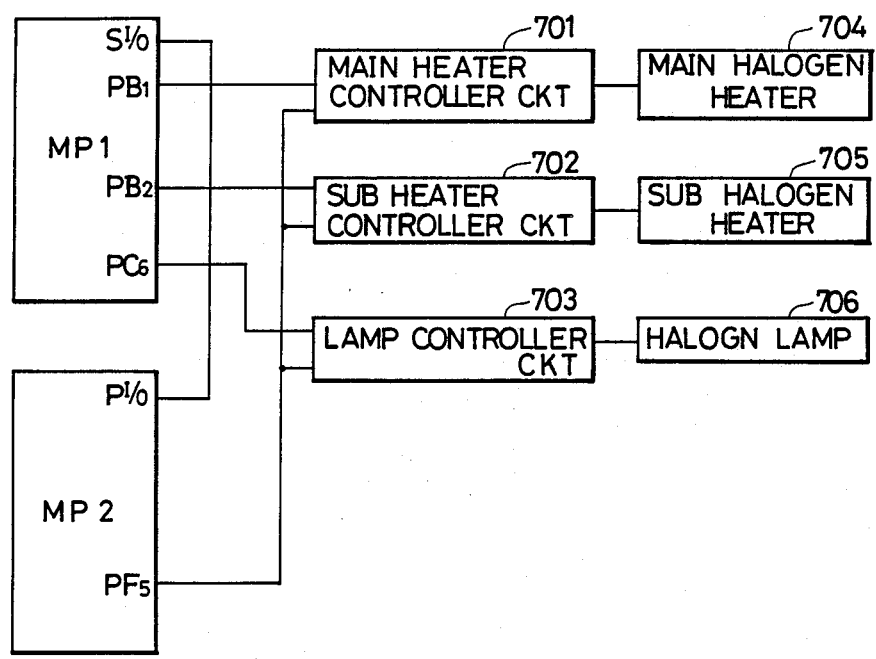
FIG. 7 is a circuit diagram showing the main part of FIG. 3.

FIG. 7 shows a circuit diagram of the portions regarding the heater and lamp in FIG. 3. The MP1 outputs halogen heater driving signals from output ports PB1 and PB2 to a main halogen heater controller 701 and to a sub halogen heater controller 702 and outputs a halogen lamp driving signal for optical exposure from an output port PC6 to a halogen lamp controller 703, respectively, thereby allowing the lighting ON/OFF control of each load to be executed. The above controllers are gated in response to a control signal which is outputted from an output port PF5 of the MP2. When the PF5 of the MP2 is at an "H" level, the heater or lamp is turned on in response to the control signals from the PB1, PB2 and PC6 of the MP1. When the PF5 of the MP2 is at an "L" level, the outputs of the gates unconditionally become "L", so that the loads are turned off.

In the case where abnormality occurs in the control in a copier or the like; there occurs a danger with regard to a large current load such as the halogen lamp or heater and such abnormality will be a cause for a fire or the like. Therefore, such danger has to be prevented with the highest priority.

Figure 8:
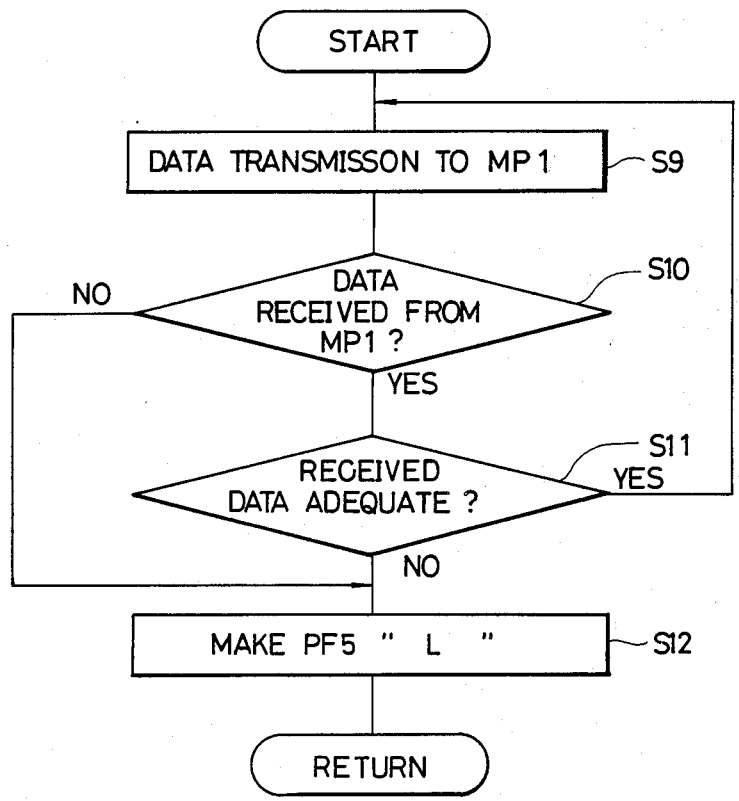
FIG. 8 is a flow chart for explaining the operation of the circuit of FIG. 7.

Next, a control method for prevention of danger in the case where the program execution by the MP1 for controlling the heater and lamp malfunctioned due to the electrostatic noises and the like from the inside and outside will be described with reference to a flow chart of FIG. 8. FIG. 8 shows the flow chart when the MP2 controls the load of the MP1. The MP1 and MP2 are coupled by the serial communication terminals S I/O and other input/output terminals, thereby mutually observing the program execution states. For instance, when the MP2 sends data to the MP1 by means of the serial communication (S9), an observation is made to see if a reply data for that data is transmitted from the MP1 (S10). When the reply data is sent, a check is made to see if the data is adequate (S11). In the case where it is the inadequate data, or in the case where no reply data is sent in step S10, the MP2 determines that the MP1 is abnormal and sets the port PF5 of the MP2 to "L", thereby turning off the load and resetting the MP1.

Due to this, even if the MP1 outputted any signals from the PB1, PB2 and PC6 as the result of program malfunction, it is possible to eliminate a danger due to the continuous turn-on of the heater and lamp.

It is obviously possible to detect the abnormality in accordance with the format such that the detection is made from the MP2 to the MP3 or from the MP1 or MP3 to the MP2.

Also, the invention is not limited to a copier but may be applied to other apparatus using microcomputers.

As described above, the load control of a microcomputer can be stopped by another microcomputer, so that even if the microcomputer for controlling the load malfunctions, its damage can be minimized. In addition, there is no need to vainly stop the apparatus.

The third embodiment will now be explained.

Figure 9:
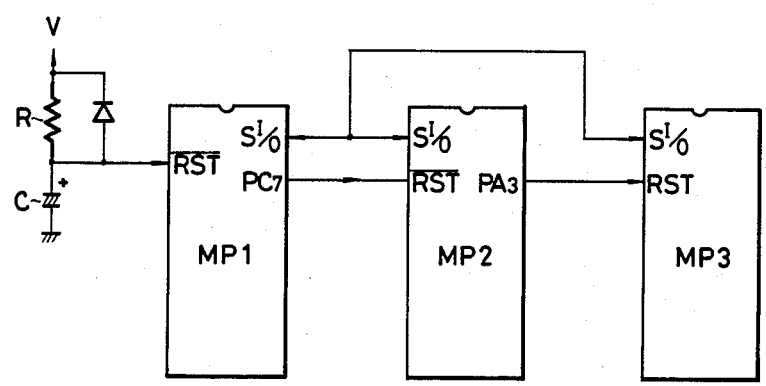
FIG. 9 is a circuit diagram showing the main part of FIG. 3.

FIG. 9 shows the main part of the circuit of FIG. 3, in which V denotes a power source voltage; R is a resistor; C a capacitor; D a diode; S I/O a serial communication input/output; and $\overline{RST}$ a reset terminal. This circuit will now be explained using a flow chart of FIG. 10.

In the embodiment, a priority of each microcomputer is determined as follows in consideration of the control content that is processed by each microcomputer. Namely, the MP1 for controlling the key input and display output has the top priority (highest significance), the MP2 for controlling the operation sequence has the second priority, then the MP3 for controlling the motor has the lowest priority.

The microprocessors MP1, MP2 and MP3 are respectively coupled through the S I/O terminals by means of the serial communication, thereby enabling data to be transmitted and received with one another. For instance, when the MP1 transmitted data to the MP2 by the serial communication, if a reply data for it is not sent from the MP2, or if an inadequate data is sent, the MP1 will determine that the MP2 is abnormal, thereby resetting the MP2. The abnormality can be obviously detected in the format such that the detection is made from the MP1 to the MP3 or from the MP2 or MP3 to the MP1.

FIGS. 10A, 10B and 10C show flow charts for the controls of the MP1, MP2 and MP3, respectively.

After the power source of the apparatus main body was turned on, a reset signal (L-level signal) is immediately inputted to the $\overline{RST}$ terminal of the MP1 due to the circuit consisting of the resistor R and capacitor C, so that the MP1 is reset (A-1). When the capacitor C is charged thereafter and the $\overline{RST}$ terminal is set from "L" to "H" (from the Low state to the High state), the MP1 is set and the program in and after step A-2 is executed.

The MP1 sets a port PC7 to "L" for a predetermined interval and resets the MP2 (A-2). Then, the MP1 executes the ordinary program for the key input from the console panel or display output to the console panel, and for other processes, etc. (A-3). When an error is detected in the MP2 while the MP1 is executing the ordinary program process, the port PC7 is set to "L" again for a predetermined interval and the MP2 is reset (A-5), then the program from step A-3 is again executed. When the port PC7 of the MP1 becomes "H" and the MP2 is set, an output port PA3 of the MP2 is set to "L" for a predetermined interval, thereby resetting the MP3 (B-1). The MP2 then performs the sequence control and other control (B-2). When an error is detected in the MP3 while the MP2 is executing the ordinary program, the output port PA3 of the MP2 is set to "L" for a predetermined interval and the MP3 is reset (B-3, B-4), then the program from step B-2 is again executed. When the port PA3 of the MP2 becomes "H" and the MP3 is set (C-1), the motor control and other control are carried out (C-2) and this process routine is repeated. In this way, when the MP1, MP2 and MP3 are executing the controls according to the respective ordinary programs, it can be considered that the apparatus is in the normal control state.

On the other hand, as described above, in the case where the MP1 detects an error in the MP2 due to the communication data or communication condition and the MP2 is reset/set, the MP2 can be restarted. Due to this control, the MP3, which apparently has a lower priority than the MP2, is reset/set. In addition, since the MP1 can observe the condition of the MP3, when an error is detected in the MP3, the MP1 can directly reset the MP3 as well.

This apparatus is not limited to only a copier but can be obviously applied to other apparatus using microcomputers.

In this way, when the microcomputer having a high priority is reset, the lower significant microcomputers are reset; therefore, even if one of a plurality of microcomputers should malfunction, damage to the apparatus can be minimized. Also, since there is no need to reset all of the microcomputers, it is unnecessary to vainly stop the apparatus.

The fourth embodiment will now be explained.

FIG. 11 is a circuit diagram showing the main part of the MP1 in FIG. 3, in which V denotes the power source voltage; C is the capacitor; R is the resistor; and D is the diode. The zero-cross signal ZCR (pulse at 5 V) of which the zero-cross point of the power source frequency was detected by a well-known circuit is interrupted and inputted to an INT1 terminal. The interruption of this zero-cross signal allows a sub-routine program mentioned later to be executed.

The control of the circuit in FIG. 11 will then be explained with reference to flow charts of FIGS. 12A and 12B. FIG. 12A is the flow chart for a main program of the MP1 and FIG. 12B is the flow chart for a sub-routine program, respectively.

When the power source is turned on, the $\overline{\text{RESET}}$ terminal first becomes "L" by the circuit consisting of the capacitor C and resistor R and the MP1 is reset. Thereafter, the capacitor C is charged and the $\overline{\text{RESET}}$ terminal becomes "H" and the main program is started. First, the microcomputer MP1 is initialized (S21) and a main flag to confirm the execution of the main program is set into a predetermined address in the sub-routine program (S22). If the zero-cross signal interrupts, the sub-routine program will be executed (S23, S24). If not, the microcomputer MP1 will carry out the processes such as the key input and display output and the like from the console section or the like (S25). These processes in steps S22 to S25 are periodically repeated at a predetermined cycle. When the MP1 detects the zero-cross signal ZCR based on the power source frequency during the execution of those processes, it starts the execution of the sub-routine program. First, the memory contents and the like during the execution of the main program process are temporarily stored into the registers for safety in order to prevent that the memory contents are broken (S31). Then, a check is made to see if the main flag is set into the predetermined address of the sub-routine program or not (S32). If the main flag is set, the microcomputer MP1 will be determined to be normal. Thus, the main flag is reset (S33) and the control of the flickering interval of the display during the execution of the sub-routine program, and the like are performed (S34). The memory contents stored previously into the registers are returned to the registers before the zero-cross signal interrupts (S35) and the process routine returns to the main program.

Unless the main flag is set in step S32, the MP1 will be determined to be abnormal. Thus, the process routine jumps to the initialization of the main program (S36) and the execution of the program is performed from the beginning. That is, the microcomputer detects the error by itself and resets. At this time, since the display flickers or indicates that the apparatus is not normal, the operator can find the abnormality of the microcomputer. On the other hand, when the microcomputer is decided to be abnormal in step S32, the process routine may skip to the initialization of the main program or may skip to other particular address in dependence upon the program. In addition, set/reset of the main flag may be reversed.

Also, the processes in steps S22 to S25 of the main program are executed at least once or more times during the process interval of the interruption sub-routine program, namely, during one period of the zero-cross signal.

The invention is not limited to a copier but may be obviously applied to other apparatus using microcomputers.

As described above, checking means for confirming the execution of the main program is provided in the sub-routine program of the microcomputer and the process routine skips to a predetermined address of the program when the microcomputer is determined to be abnormal by this checking means; therefore, the microcomputer does not continuously malfunction but is reset by itself, so that safety is improved.

The present invention is not limited to the foregoing embodiments, but various modifications are possible within the spirit and scope of the appended claims.

What is claimed is:

1. A control apparatus comprising:
   a first microcomputer;
   a second microcomputer; and
   a third microcomputer;
   wherein said first microcomputer is reset in response to power being supplied to said control apparatus, and then outputs a reset signal for resetting said second microcomputer while starting a control operation, and then during the control operation, when said first microcomputer detects an abnormality of said second microcomputer, said first microcomputer outputs a reset signal for resetting said second microcomputer while continuing the control operation, and wherein said second microcomputer is reset in response to the reset signal from said first microcomputer, and then outputs a reset signal for resetting said third microcomputer while starting a control operation, and then during the control operation, when said second microcomputer detects an abnormality of said third microcomputer, said second microcomputer outputs a reset signal for resetting said third microcomputer while continuing the control operation.

2. A control apparatus according to claim 1, wherein said second microcomputer includes a terminal for inputting a reset signal, and wherein said first microcomputer directly inputs a reset signal into said input terminal of said second microcomputer.

3. A control apparatus according to claim 1, wherein said first microcomputer resets said second microcomputer upon detecting an abnormality of said second microcomputer.

4. A control apparatus according to claim 3, wherein said first microcomputer transmits predetermined data to said second microcomputer, and judges that said second microcomputer is malfunctioning when an answering data from said second microcomputer is not received or said answering data is abnormal.

* * * * *

UNITED STATES PATENT AND TRADEMARK OFFICE
CERTIFICATE OF CORRECTION

PATENT NO. : 4,882,669

DATED : November 21, 1989

INVENTOR(S) : Miura, et al.

It is certified that error appears in the above-identified patent and that said Letters Patent is hereby corrected as shown below:

ON THE TITLE PAGE,
  AT [54]:

Change "FAIL SAFE" to read --FAIL-SAFE--.

AT [57]:

Change "mircocomputer" to read --microcomputer--; and

Change "send" to read --sent--.

IN THE DRAWINGS
  AT Sheet 5

Change "EGUAL" to read --EQUAL-- (both occurrences).

AT Sheet 7

Change "HALOGN" to read --HALOGEN--.

AT Sheet 8

Change "SEGUENCE" to read --SEQUENCE--.

AT Sheet 9

Change "MEIN" to read --MAIN--.

UNITED STATES PATENT AND TRADEMARK OFFICE
CERTIFICATE OF CORRECTION

PATENT NO. : 4,882,669

DATED : November 21, 1989

INVENTOR(S) : Miura, et al.

It is certified that error appears in the above-identified patent and that said Letters Patent is hereby corrected as shown below:

COLUMN 1:

Line 1, change "FAIL SAFE" to read --FAIL-SAFE--;

Line 24, Change "a" to read --the--;

Line 25, change "the" to read --a--; and

Line 34, change "correctly, if" to read --correctly. If--.

COLUMN 2:

Line 2, delete "a"; and

Line 61, delete "on".

COLUMN 4:

Line 65, change "matiom" to read --mation--.

COLUMN 5:

Line 24, change "ferred" to read --fer--.

COLUMN 6:

Line 62, change "was" to read --is--.

UNITED STATES PATENT AND TRADEMARK OFFICE
CERTIFICATE OF CORRECTION

PATENT NO. : 4,882,669

DATED : November 21, 1989

INVENTOR(S) : Miura, et al.

It is certified that error appears in the above-identified patent and that said Letters Patent is hereby corrected as shown below:

COLUMN 8:

Line 35, change "other" to read --another--.

Signed and Sealed this

Nineteenth Day of February, 1991

Attest:

HARRY F. MANBECK, JR.

Attesting Officer

Commissioner of Patents and Trademarks